United States Patent
Saier et al.

(10) Patent No.: US 9,013,525 B2
(45) Date of Patent: Apr. 21, 2015

(54) IMAGE BRIGHTNESS CONTROL SYSTEM

(75) Inventors: Horst Saier, Vöhrenbach (DE); Thomas Sagcob, Donaueschingen (DE); Thomas Menzl, Villingen (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 1733 days.

(21) Appl. No.: 11/352,459

(22) Filed: Feb. 10, 2006

(65) Prior Publication Data

US 2006/0274213 A1    Dec. 7, 2006

(30) Foreign Application Priority Data

Feb. 11, 2005   (EP) ..................................... 05002975

(51) Int. Cl.
| | | |
|---|---|---|
| G09G 3/00 | (2006.01) | |
| H04N 5/57 | (2006.01) | |
| H04N 21/414 | (2011.01) | |
| H04N 21/431 | (2011.01) | |
| H04N 21/45 | (2011.01) | |
| H04N 21/478 | (2011.01) | |

(52) U.S. Cl.
CPC .......... *H04N 5/57* (2013.01); *H04N 21/41422* (2013.01); *H04N 21/4318* (2013.01); *H04N 21/4524* (2013.01); *H04N 21/478* (2013.01)

(58) Field of Classification Search
CPC ............ H04N 5/14; G08G 1/123; G09G 5/00
USPC ............... 340/990; 348/31, 673; 345/76, 692, 345/855, 7
See application file for complete search history.

(56) References Cited

U.S. PATENT DOCUMENTS

| | | | |
|---|---|---|---|
| 6,288,690 B1 | 9/2001 | Byun | |
| 6,362,835 B1 * | 3/2002 | Urbanus et al. ............... | 345/692 |
| 6,462,768 B1 * | 10/2002 | Oakley ............................ | 348/31 |
| 2001/0040534 A1 * | 11/2001 | Ohkawara et al. ................ | 345/7 |
| 2002/0089474 A1 * | 7/2002 | Wu .................................. | 345/76 |
| 2002/0163547 A1 * | 11/2002 | Abramson et al. ............ | 345/855 |
| 2003/0025615 A1 * | 2/2003 | Kato et al. .................... | 340/990 |

FOREIGN PATENT DOCUMENTS

| | | |
|---|---|---|
| EP | 0 512 332 A2 | 11/1992 |
| EP | 1 267 574 A2 | 12/2002 |
| JP | 0 726 1731 A | 10/1995 |

OTHER PUBLICATIONS

European Search Report for corresponding Application No. EP 05002975.0, mailed Jul. 28, 2005, 6 pages.

* cited by examiner

*Primary Examiner* — Quan-Zhen Wang
*Assistant Examiner* — Yuk Chow
(74) *Attorney, Agent, or Firm* — Brooks Kushman P.C.

(57) ABSTRACT

A brightness control system enhances a displayed image. The system selectively alters the brightness of a portion of the image to improve the clarity, noticeability, and intelligibility of information provided on the display. When used with a vehicle navigation system, the brightness adjustment system may emphasize vehicle or destination location display, driving directions, route planning information, or other information provided to the driver.

23 Claims, 19 Drawing Sheets

IMAGE BRIGHTNESS CONTROL SYSTEM

PRIORITY CLAIM

This application claims the benefit of priority from European Patent Application No. 05002975.0, filed Feb. 11, 2005, which is incorporated by reference herein.

BACKGROUND OF THE INVENTION

1. Technical Field

The invention relates to a brightness controller for adjusting the brightness of an image on a display. In particular, the invention relates to a brightness control system for modifying the brightness of specific portions of an image.

2. Related Art

Both analog displays such as Cathode Ray Tubes (CRTs) and digital displays such as Liquid Crystal Displays (LCDs) create images from individual closely spaced points. Each point in the image is referred to as a picture element or pixel. The image data in the video data stream sent to the display conveys information which controls the brightness of each pixel.

In the past, dynamic changes to image brightness often required time consuming and computationally expensive brightness recalculations. This was particularly true when the recalculation of image data was done on a pixel-by-pixel basis. With the introduction and widespread use of high resolution displays, processing demands for dynamic brightness changes were often quite significant.

Displays are common components of vehicle navigation systems, entertainment systems, and game systems. A navigation system, for example, provides core functionality including the display of map location and route information to the driver. In addition to these core functions, the navigation system often provides extensive additional functionality for the driver. Thus, the processing demands on the navigation system (and other systems) are already significant, even without the added burden of dynamic image brightness control.

Therefore, a need exists for an improved brightness control system.

SUMMARY

A brightness control system adjusts the brightness of a portion of an image, without time consuming or computationally expensive pixel-by-pixel image recalculation. When used with a vehicle navigation system, the brightness control system may emphasize vehicle or destination location display, driving directions, route planning information, or other information provided to the driver. The brightness control system may be used with any other system which displays images, including entertainment systems, game systems, communication systems, or other systems.

The brightness control system includes a video signal input and a brightness control signal input. A video signal including pixel image data is provided on the video signal input, while a brightness control signal is provided on the brightness control signal input. The brightness control signal is synchronized with the video signal (e.g., with horizontal synchronization information) to specify enhancement for a selected pixel subset of the pixel image data. Modification logic in the brightness control system enhances the brightness of the selected pixel subset. To that end, the modification logic may determine a brightness adjustment responsive to the brightness control signal and apply the brightness adjustment to the selected pixel subset of the pixel image data.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

Figure 1:
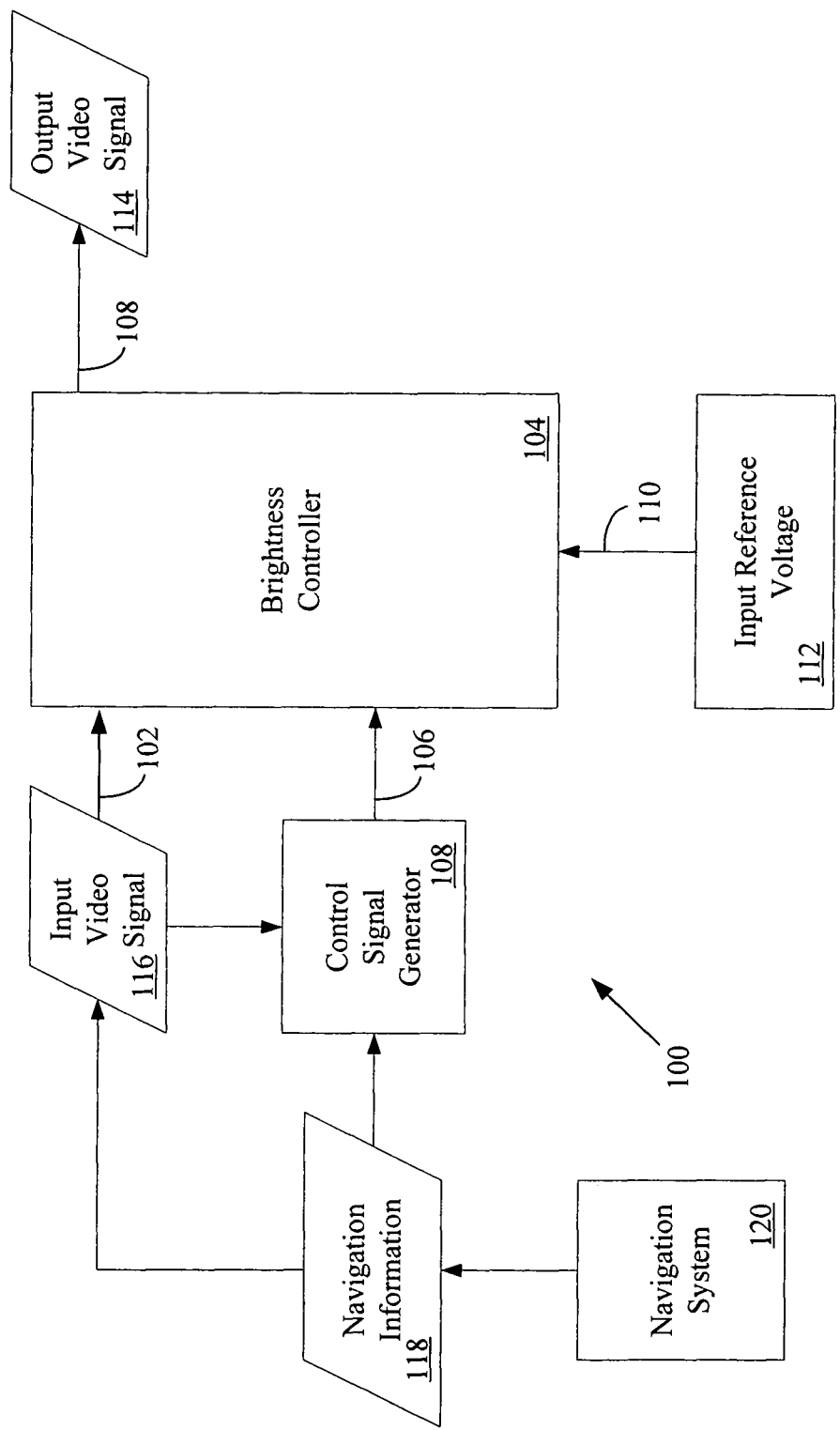
FIG. 1 shows a brightness control system.

In FIG. 1, an image brightness control system 100 includes a video signal input 102, a brightness controller 104, a brightness control signal input 106, and a video signal output 108. A control signal generator 108 provides a brightness control signal on the brightness control signal input 106. A reference voltage input 110 provides a reference voltage 112 to the brightness controller 104. In response to the brightness control signal, the brightness controller 104 selectively alters the brightness of the image or portion of the image represented by the output video signal 114, compared to the original image represented in the input video signal 116.

The image may include, for example, navigation information 118 received from a navigation system 120. The brightness control system 100 may receive and enhance input video signals from many other sources, however, including entertainment systems, video game systems, car phone systems, or other systems. The navigation system 120 may include a receiver for navigation signals, including radio signals from a Global Positioning System (GPS), radio signals from a LOng RAnge Navigation (LORAN) system, or other navigation signals. The navigation information 118 may include map data, such as street, road, intersection, bridge, viaduct, ferry, building, traffic regulation and street closure information; point of interest (POI) information; road and weather conditions; directory and address range information; destination information; route information; or other navigation information The navigation information 118 may also include position and motion data, such as relative position, altitude, bearing, average velocity, instantaneous velocity, acceleration, expected position and/or expected arrival time information. Any of the navigation information 118 may be rendered in the image, and may be selectively enhanced for clarity and intelligibility through brightness adjustment of the pixels which represent the navigation information 118 in the display, or through brightness attenuation of surrounding pixels.

The input video signal 116 may convey a sequence of individual images to the brightness controller 104. The input video signal 116 may also include timing and synchronization information such as horizontal and vertical blanking period information, horizontal and vertical synchronization information, luminance and color information, and other video signal information. The input video signal 116 may include or may be encoded as a luminance/chrominance signal (e.g., a YUV signal), red-blue-green (RGB) signal, or as another type of signal. Thus, input video signal 116 may define the brightness and color for each pixel in the image, as well as the horizontal (e.g., line), vertical (e.g., frame), and pixel timing and synchronization information for displaying the image on an analog or digital display.

The control signal generator 108 may include synchronization logic responsive to the synchronization information included in or accompanying the input video signal 116. The control signal generator 108 generates a brightness control signal synchronized to the position of pixels to be brightened (or to be attenuated) in one or more frames of an image sequence. The brightness control signal may be synchronized with respect to any combination of horizontal synchronization information, vertical synchronization information, pixel timing information, or other information in or accompanying the input video signal 116. The synchronized brightness control signal may specify a brightness adjustment or attenuation for any selected pixel subset in the pixel image data represented in the input video signal 116.

The control signal generator 108 may also receive the navigation information 118 from the navigation system 120. The brightness control signal may then be synchronized to the presence and/or location in the image of any desired navigation information 118, or to the presence and/or location of any other desired information provided by an entertainment system, game system, or other system. For example, the brightness control signal may be asserted for those pixels at which the navigation information 118 (e.g., a vehicle location or destination location) is rendered in the image, for the pixels at which the navigation information 118 is absent, or for image areas (e.g., a bounding box or circle) around those pixels.

The reference voltage 112 may specify a brightness adjustment for the brightness controller 104. Alternatively, the brightness controller 104 may derive a brightness adjustment using the reference voltage 112. For example, when the brightness control signal is asserted, the brightness controller 104 may use pulse width modulation and a resistor-capacitor (RC) filter to derive a brightness adjustment responsive to the reference voltage 112.

The brightness controller 104 receives the input video signal 116 and the brightness control signal. In response to the brightness control signal, the brightness controller 104 determines a brightness adjustment and enhances the brightness of the pixel subset to which the brightness control signal is synchronized. The brightness controller 104 avoids time consuming and computationally expensive recalculation of image data on a pixel-by-pixel basis. Instead, the brightness controller responds to the synchronized brightness control signal which specifies the pixel subset for which to enhance brightness.

Figure 2:
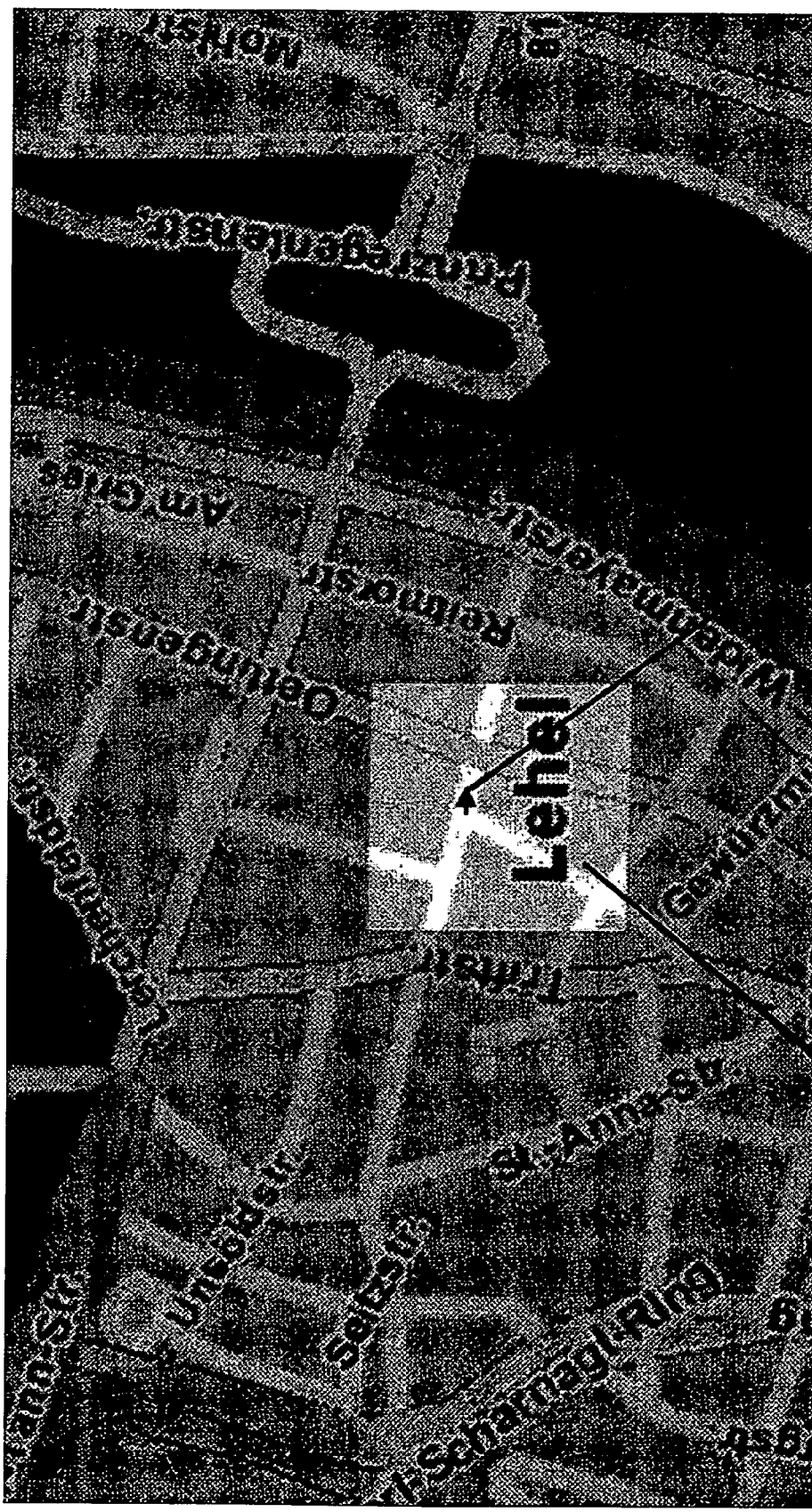
FIG. 2 shows an image in which a selected pixel subset has been brightened.

FIG. 2 shows an example of brightness control for a subset of image pixel data in a navigation map 200 on a display. In the example shown in FIG. 2, the navigation map 200 shows a section of a larger map around the area in which the vehicle currently is located. The current position of the vehicle is indicated by an icon 210 (e.g., an arrow pointing in the direction of vehicle movement) on the map 200. The brightness controller 104 provides a brightness enhanced region 220 around the icon 210. While the region 220 is shown as a rectangle, the region 220 may take other shapes, including a circle shape, oval shape, polygonal shape, sector shape, or other shape.

The driver may select the shape (e.g., square or circular), size (e.g., 100×100 pixels or 50 pixel radius), and position (e.g., centered on the vehicle location, destination, or a point of interest) of the region 220 using any available operator input. The operator input may include a voice recognition system, keyboard including cursor keys, or other input. The brightness controller 104 may enhance the brightness of the region 220 by increasing the overall brightness of a subset of image pixel data corresponding to the region 220. Alternatively or additionally, the brightness controller 104 may enhance the brightness of the region 220 by attenuating the brightness of the pixels surrounding the region 220. The selective enhancement is particularly effective at night, when the overall illumination of a vehicle cabin is low. The brightness controller 104 thereby helps to increase the clarity, intelligibility, and speed of recognition of the information provided on the display.

Figure 3:
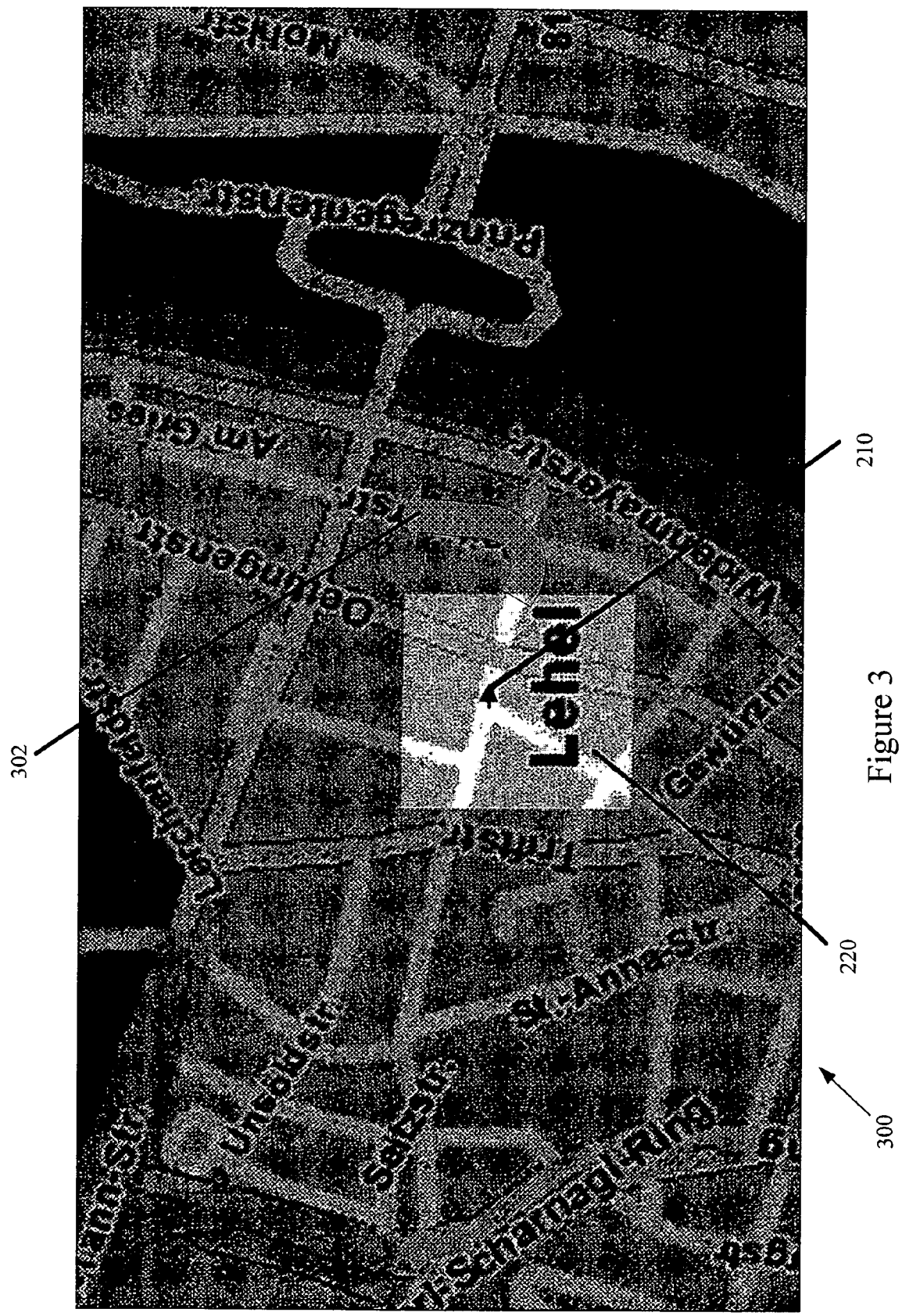
FIG. 3 shows an image in which a selected pixel subset has been brightened.

FIG. 3 illustrates a navigation map 300 including an additional brightness enhanced subset of image pixel data in the form of a directional arrow 302. The navigation system 120 may generate the directional arrow 302 to indicate the next direction to take on the route to a destination. The brightness control signal may then be asserted for each pixel which makes up the directional arrow 302 and/or the region 220, or for each pixel which makes up the surrounding regions.

Figure 4:
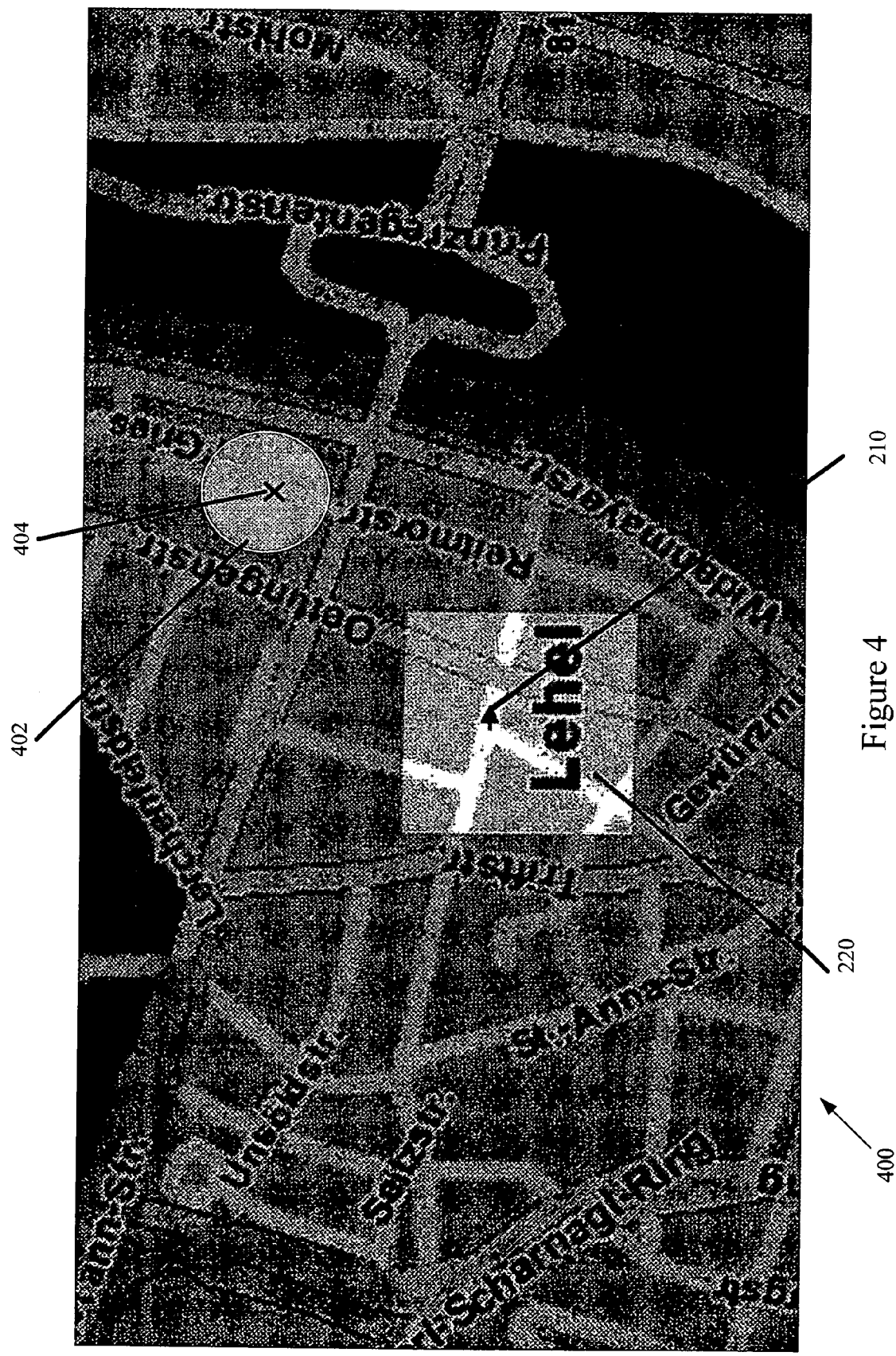
FIG. 4 shows an image in which a selected pixel subset has been brightened.
Figure 5:
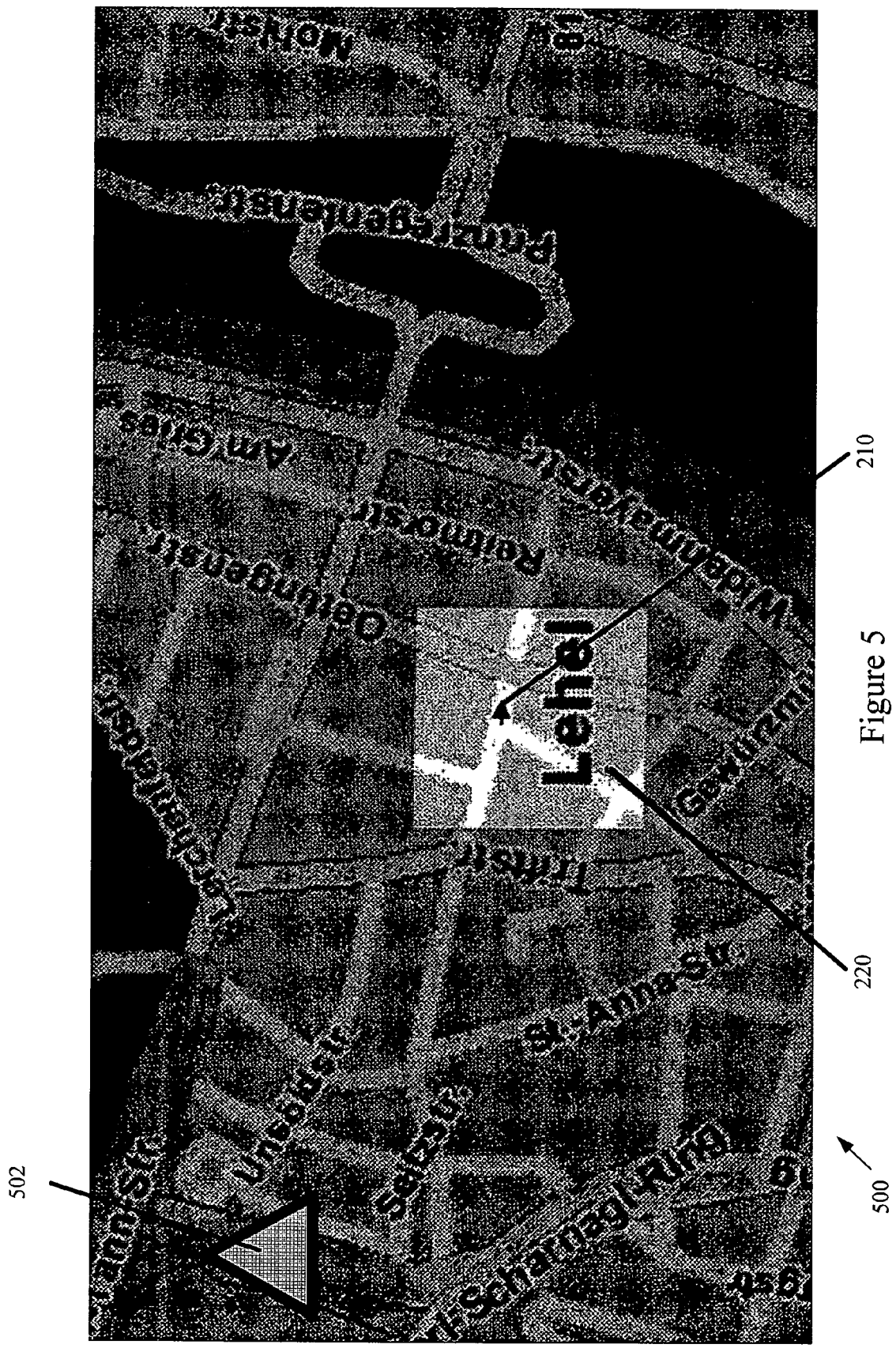
FIG. 5 shows an image in which a selected pixel subset has been brightened.

FIG. 4 illustrates a navigation map 400 including a brightness enhanced subset of image pixel data in the form of a target circle 402. The target circle 402 highlights a vehicle destination 404. Alternatively, the target circle 402 may highlight an area of interest, location of traffic congestion, a locus of points of pre-defined distance from a position, or other location of interest. Multiple target circles or other shapes may be generated for multiple locations of interest. FIG. 5 illustrates another example brightness control for a subset of image pixel data. In FIG. 5, a brightness enhanced hazard symbol 502 is rendered on the map 500. The hazard symbol 502 may represent a serious traffic, road, or weather condition at any given location. Furthermore, the hazard symbol 502 may be displayed to provide a warning about a particular vehicle condition, such as an engine malfunction, low tire pressure, fuel, oil, or other fluid level warning, an electronics error, GPS signal error, or a collision avoidance warning. The brightness control system 106 may flash or otherwise draw attention to the warning symbol 502 (or any other brightness enhanced region on the display) by altering the brightness enhancement between different levels, e.g., on a periodic basis.

Figure 6:
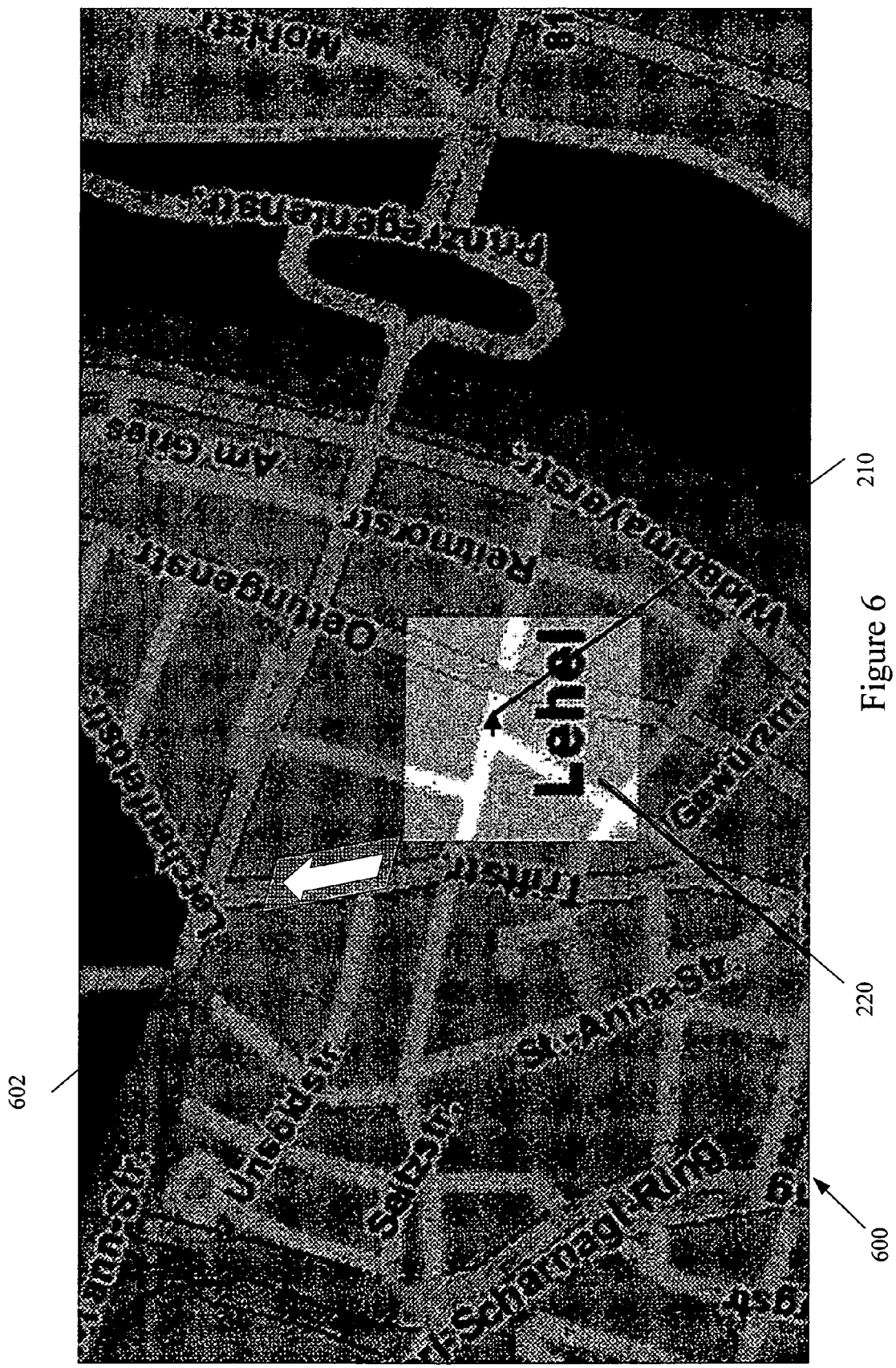
FIG. 6 shows an image in which a selected pixel subset has been brightened.

FIG. 6 illustrates another example of brightness enhancement in a navigation map 600. In FIG. 6, the navigation map 600 includes a brightness enhanced road information symbol 602. The road information symbol 602 may indicate a road or traffic condition, such as a limited access road, construction site, parade route, or any other time or space-restricted road condition. As another example, the road information symbol 602 illustrated in FIG. 6 may depict a one-way road, with the direction of the arrow pointing in the direction of allowed traffic flow.

Figure 7:
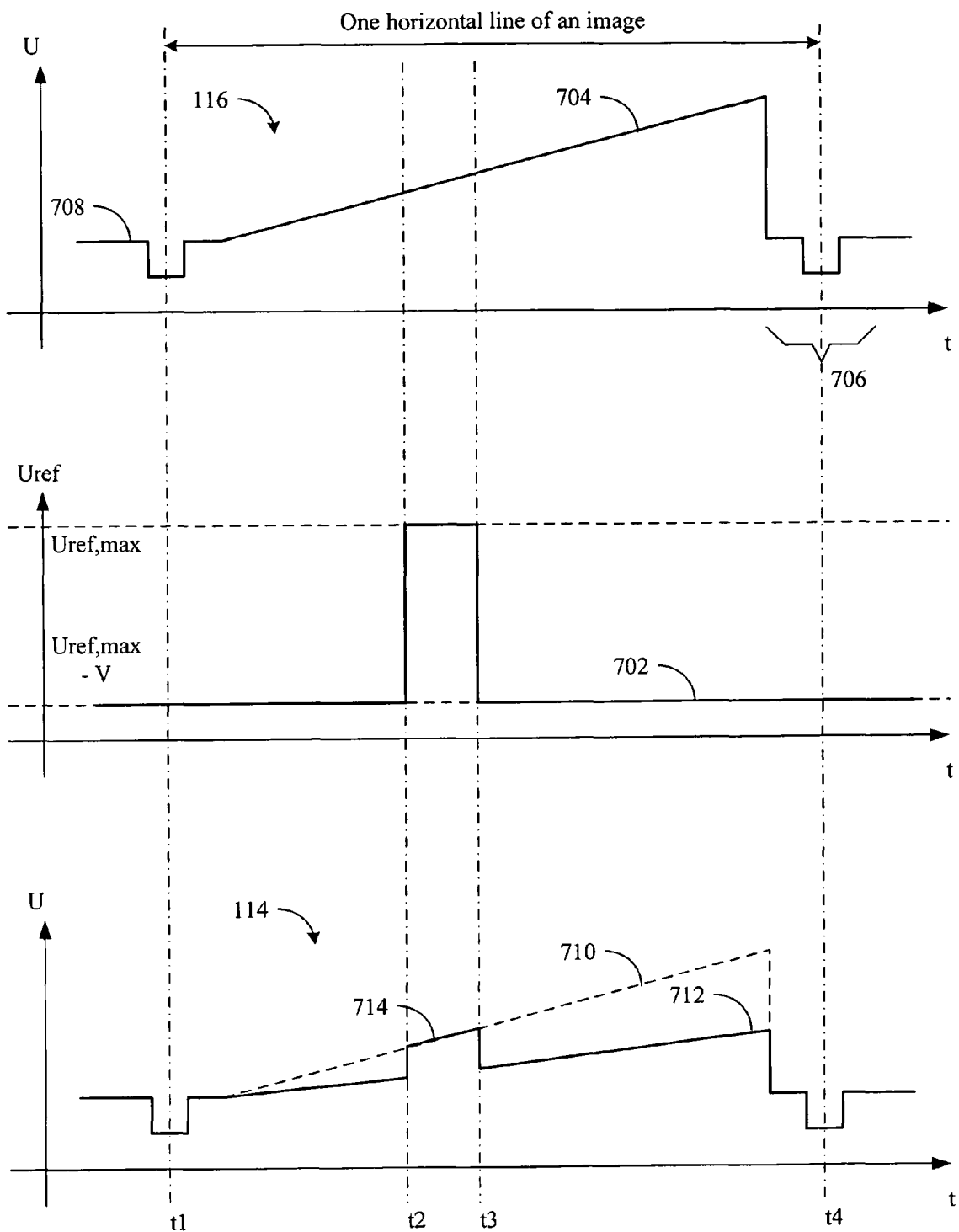
FIG. 7 shows selective brightness control of specific pixels in a horizontal line of an input video signal.

FIG. 7 illustrates voltage-time diagrams which show brightness control selectively activated during a horizontal line of a displayed image. FIG. 7 shows a portion of the input video signal 116, a modulated reference voltage 702, and a brightness enhanced output video signal 114. Several points in time, t1, t2, t3, and t4 are labeled on the horizontal axis. The points in time t1 and t4 correspond to the beginning and end of a horizontal line of the input video signal 116. The input video signal 116 includes an active video portion 704 which includes brightness and color information and also includes horizontal blanking intervals 706. The black-level 708 represents the brightness of the darkest portion of the image.

The modulated reference voltage 702 assumes a maximum value, Uref,max during the time interval between t2 and t3. In the time periods before t2 and after t3, the modulated reference voltage 702 may be reduced. In the example shown in FIG. 7, the modulated reference voltage is reduced by V, resulting in a nominal level Uref,max−V. The brightness control signal may be asserted between t2 and t3 (or before t2 and after t3) to coordinate brightness enhancement with the brightness controller 104.

Specifically, the brightness control signal may be asserted between t2 and t3 to prevent the brightness controller 104 from applying an attenuation to the active video portion 704 of the input video signal. The assertion of the brightness control signal may cause the modulated reference voltage to rise (e.g., to the value Uref,max) to a value which prevents attenuation of the input video signal between t2 and t3. The assertion of the brightness control signal may also cause the modulated voltage to rise to an intermediate level which causes the brightness controller 104 to apply less attenuation between t2 and t3 than before t2 or after t3. Alternatively, the brightness control signal may be asserted before t2 and after t3 to instruct the brightness controller 104 to apply an attenuation to the active video portion 704 of the input video signal outside of the range t2 to t3. The brightness control signal may specify the amount of attenuation (e.g., the brightness adjustment), the brightness controller 104 may determine the amount of attenuation using pulse width modulation techniques, or the brightness controller may determine the brightness adjustment in other manners.

The brightness controller 104 modifies the input video signal 116 to enhance the brightness of the pixel subset selected through synchronization of the brightness control signal with the input video signal. The resulting output video signal 114 conveys a brightness enhanced pixel subset to the display. In particular, FIG. 7 shows the original level 710 of the input video signal 116 superimposed on the enhanced level 712 of the output video signal 114.

The brightness controller 104 responds to the brightness control signal and the modulated reference voltage 702 to hold the voltage level of the input video signal unchanged between t2 and t3. In addition, the brightness controller 104 attenuates the voltage level of the input video signal before t2 and after t3. Thus, the image area around the selected pixel subset is lowered in brightness, thereby enhancing the perceived brightness of the selected pixel subset. Brightness enhanced pixel data 714 results between t2 and t3. Depending on the sampling rate of the active portion of the output video signal 114, there many be one or more pixels defined in the pixel data 714. The brightness control signal and modulated reference voltage 702 may change line-by-line and pixel-by-pixel to specify the shape or shapes to be brightness enhanced.

The attenuation applied to the input video signal 116 may be set as a configurable gain factor (e.g., an operator settable gain factor) for brightness enhancement. Alternatively, the brightness control signal may specify the gain factor. The gain factor may also be based on, and vary according to, the value of V. In other implementations, the brightness controller 104 may enhance the selected pixel subset by applying a configurable amplification factor to the input video signal 116 between t2 and t3, while holding constant, attenuating, or applying a smaller gain to the input video signal before t2 and after t3.

Figure 8:
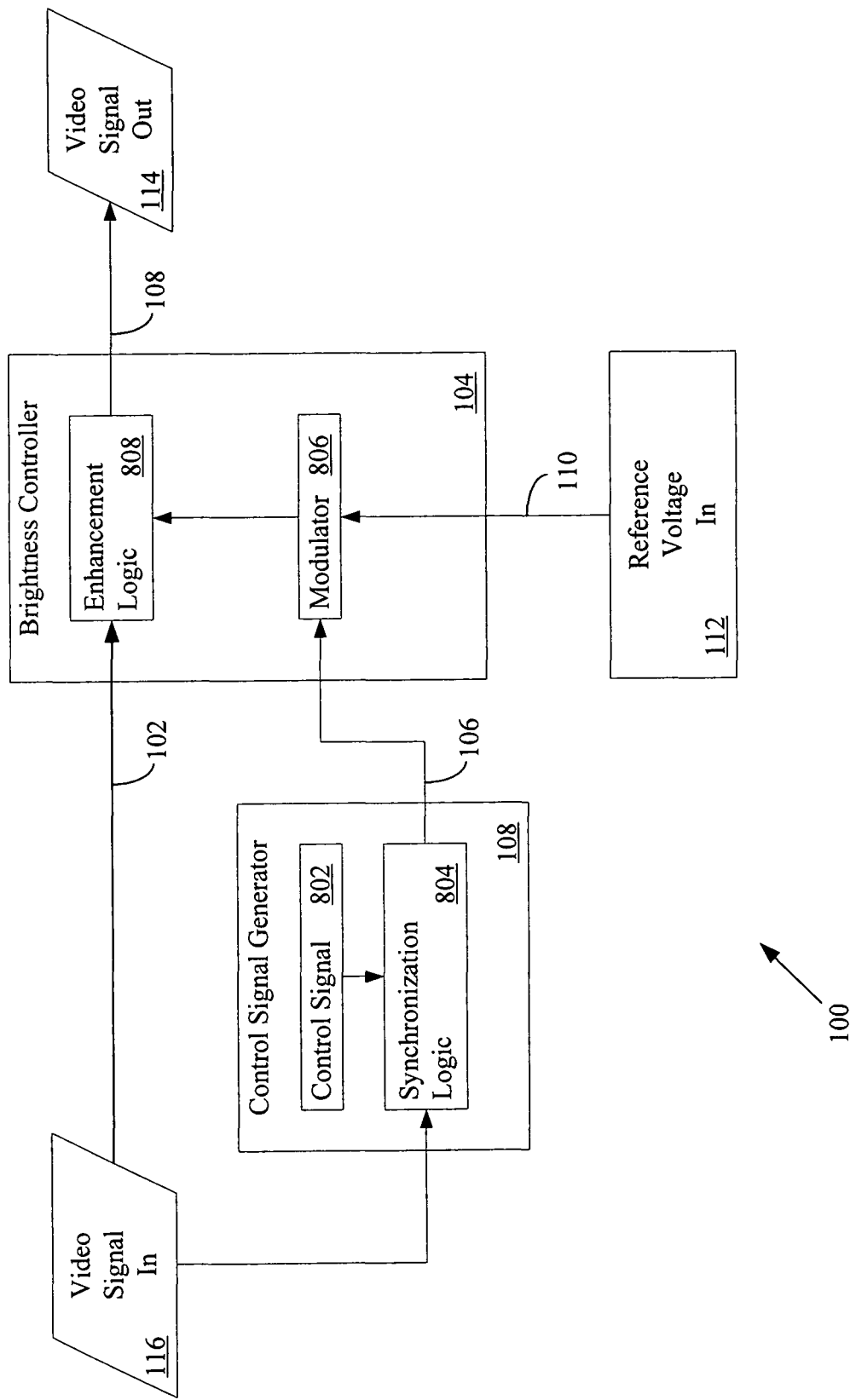
FIG. 8 shows a brightness control system.

FIG. 8 shows a more detailed implementation of the brightness control system 100. The control signal generator may include a control signal source 802 and synchronization logic 804. The control signal source 802 supplies a control signal to the synchronization logic 804. The control signal source 802 may include a DC voltage source, a pulse generator, waveform generator, look-up-table, mathematical function generator, square-wave generator, an external source of control signal input, a pulse width modulated signal source, or other source.

The synchronization logic 804 determines when to assert the brightness control signal to the brightness controller 104. The brightness control signal is synchronized to horizontal, vertical, and/or pixel synchronization information in or accompanying the input video signal 116 and/or to other sources of information, such as the navigation information 118. The control signal generator 108 may specify in the brightness control signal (or with separate signals) the brightness adjustment associated with selected subsets of image pixel data. The synchronization logic 804 may be implemented with counters, timers, and/or other timing logic using integrated or discrete circuits, including a microprocessor, microcontroller, digital signal processor (DSP), ASIC, FPGA, custom IC, or other circuitry. Alternatively or additionally, the synchronization logic 804 may include programs or firmware encoded or stored in a memory to count lines, frames, pixel clock transitions or any other synchronization data to locate any specific pixel or pixels in an image, and responsively assert the brightness control signal.

In the brightness controller 104, a modulator 806 may establish the brightness adjustment for the selected pixel subset (e.g., by varying the modulated reference voltage 702 or the voltage V). To that end, the modulator may switch a reference voltage 'on' and 'off' at a specified duty ratio. The reference voltage 112 may provide the DC voltage, while the control signal generator 108 may specify the duty ratio (i.e., the fraction of a period during which the voltage is switched 'on'). However, the duty ratio and reference voltage may be set according to an operator preference setting for brightness enhancement, may be a pre-configured parameter, or the duty ratio may be established in other manners.

Figure 9:
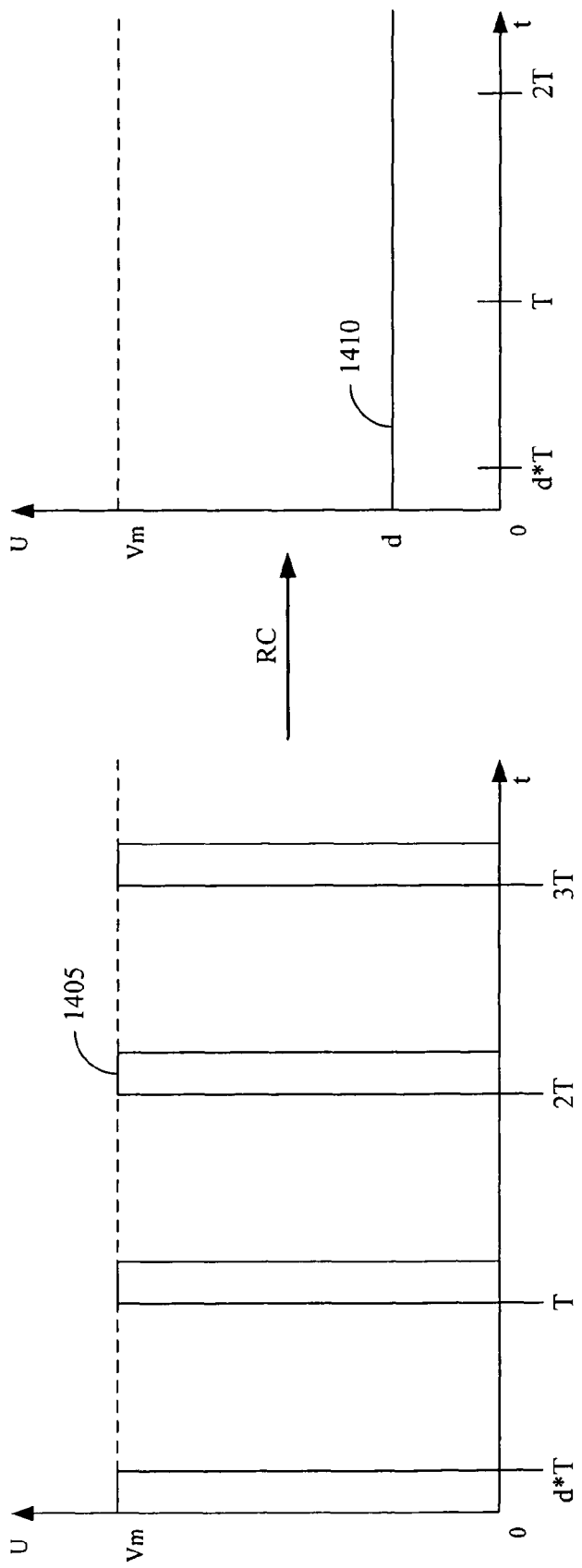
FIG. 9 shows the creation of a brightness adjustment from a pulse width modulated brightness control signal.

FIG. 9 illustrates a filtering operation which the modulator 806 may employ to convert a pulse width modulated control signal into a DC brightness adjustment level. The left hand portion of FIG. 9 depicts a sequence of voltage pulses 1405 having a period T, a duty ratio d and a maximum voltage Vm. The duty cycle, d, may be determined by dividing the period during which the pulse has a high value, here dT, by the total period of the waveform, here T. This yields dT/T=d for the duty cycle. The right hand part of FIG. 8 indicates the DC brightness adjustment 1410 resulting from filtering the pulse width modulated control signal using an RC integrator. The brightness adjustment 1410 may correspond to the duty ratio d. Thus, by adjusting the duty ratio d, every voltage value between 0 and Vm may be generated as a brightness adjustment. The brightness adjustment may be determined in other manners, however, including using a digital to analog converter (DAC), or other circuitry.

The brightness control signal may cause the modulator 806 to generate or change the brightness adjustment. For example, the brightness control signal may itself be a pulse width modulated signal, converted to the brightness adjustment. Alternatively, the brightness control signal may trigger the application, generation, or modification to another source of a pulse width modulated signal (e.g., by gating 'on' and 'off' the reference voltage input 112) to obtain the brightness adjustment. Using an RC filter, the duty ratio, d, over the cycle period T, may set the brightness adjustment according to the following equation:

$$\frac{1}{T}\int_T^{T+d} U(t)dt$$

where the voltage function U(t) is given by $$U(t)\begin{cases} U_0 & \text{for } kT \le t \le (k+d)T \\ 0 & \text{for } (k+d)T \le t \le (k+1)T \end{cases} k = 0, 1, 2, \ldots \quad (2)$$

The result is $$\frac{1}{T}\int_T^{T+d} U(t)dt = U_0 \quad (3)$$

Thus, by varying the duty ratio, d, between 0 and 100%, voltage values in the range between 0 and $U_0$ may be obtained.

Figure 10:
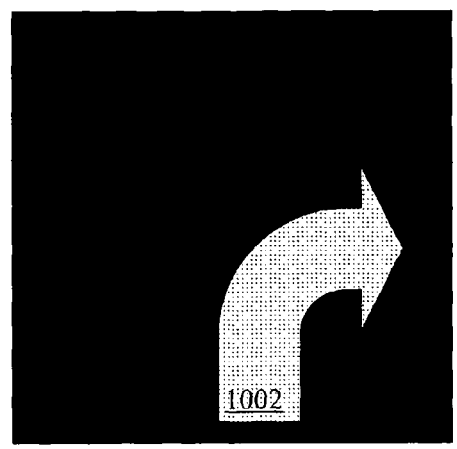
FIG. 10 shows pulse width modulated control of the brightness of a portion of an image.
Figure 10:
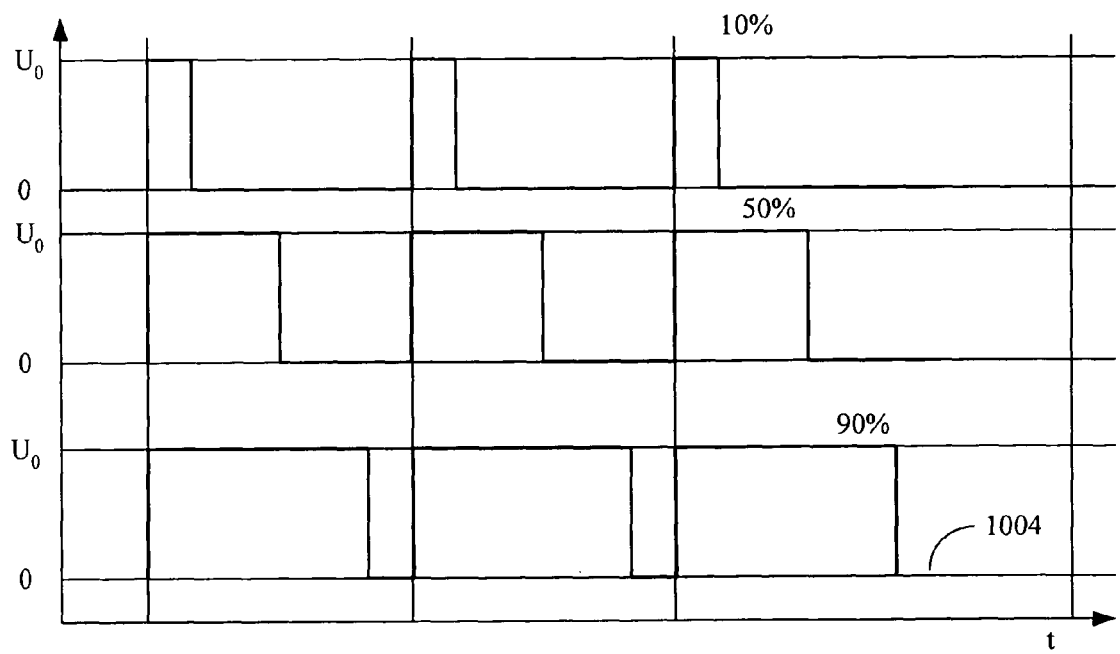
Figure 11:
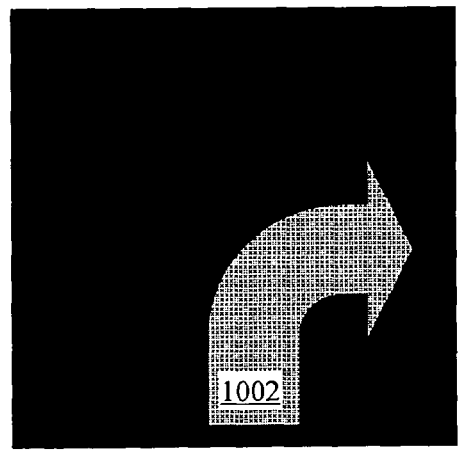
FIG. 11 shows pulse width modulated control of the brightness of a portion of an image.
Figure 11:
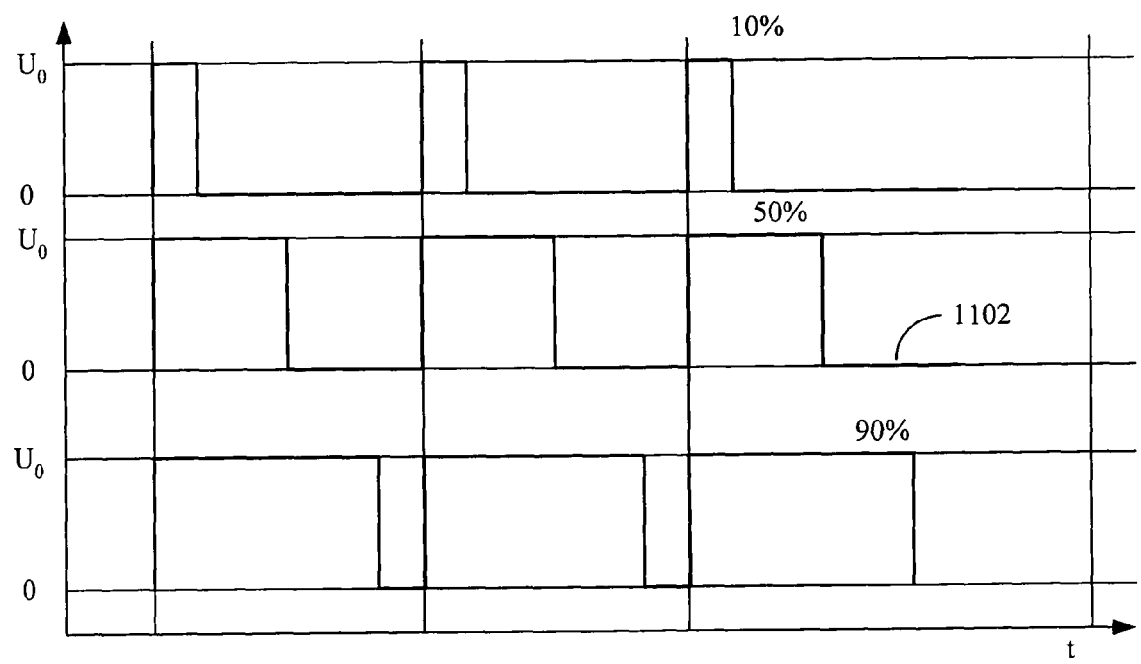
Figure 12:
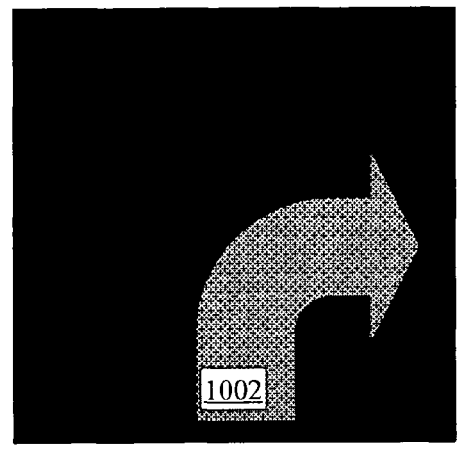
FIG. 12 shows pulse width modulated control of the brightness of a portion of an image.
Figure 12:
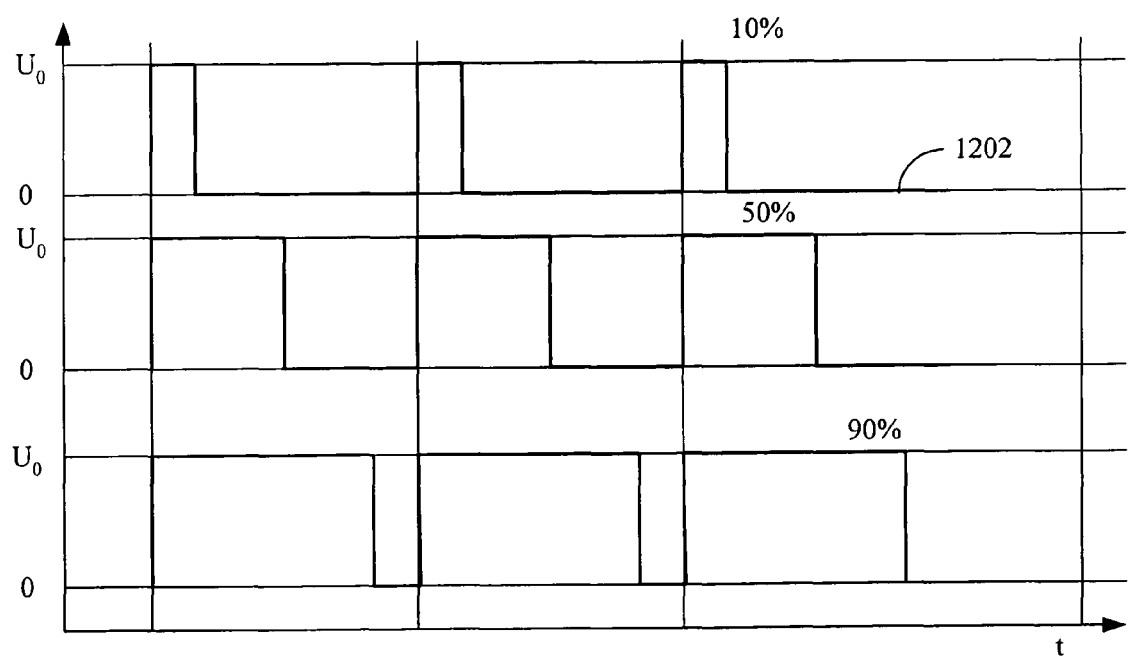

FIGS. 10, 11, and 12 illustrate a sequence of brightness enhanced images controlled by pulse width modulation. During the sequence, the brightness controller 104 changes the degree of enhancement of a selected pixel subset corresponding to a turn arrow 1002. The turn arrow 1002 becomes darker during the sequence to slowly fade the turn arrow 1002 from the image.

In FIG. 10, a pulse width modulated control signal 1004 determines the brightness adjustment applied to the turn arrow 1002. With the duty ratio set at 90%, a relatively large brightness enhancement is selected. Thus, the pixels corresponding to the turn arrow 1002 may be amplified in brightness, or the surrounding pixels may be attenuated in brightness according to the relatively large brightness enhancement. In FIG. 11, the pulse width modulated control signal 1102 has a duty ratio of 50%. The turn arrow 1002 is therefore less enhanced than the turn arrow 1002 shown in FIG. 10. In FIG. 12, the pulse width modulated control signal 1202 has a duty ratio of 10%. Accordingly, the turn arrow 1002 is less enhanced than that shown in FIG. 11. As a result, the brightness controller 104 initially enhances the turn arrow 1002 then fades out the enhancement.

In FIG. 8, the enhancement logic 808 modifies the input video signal 116 to apply the desired brightness adjustment to any selected pixel subset of the image. For example, the enhancement logic 808 may include an analog multiplier, attenuator, or level shifter which applies a gain or attenuation based on the brightness adjustment to a selected part of the active portion 704 of the input video signal 116. Alternatively, the enhancement logic 808 may include an analog to digital converter, a digital adder or multiplier, and a digital to analog converter to apply the brightness adjustment and output the enhanced video signal. As another example, the enhancement logic 808 may include a digital adder or multiplier which modifies digital RGB, YCbCr, or other digital values, according to the brightness adjustment, in a digital video signal for a digital display to change the perceived brightness of the image. The brightness adjustment may be expressed in terms of a ratio (e.g., 50% brighter or dimmer than the original signal), and absolute measure (e.g., 2V signal level or a specific brightness determined by R, G, and B values), or in other manners.

Figure 13:
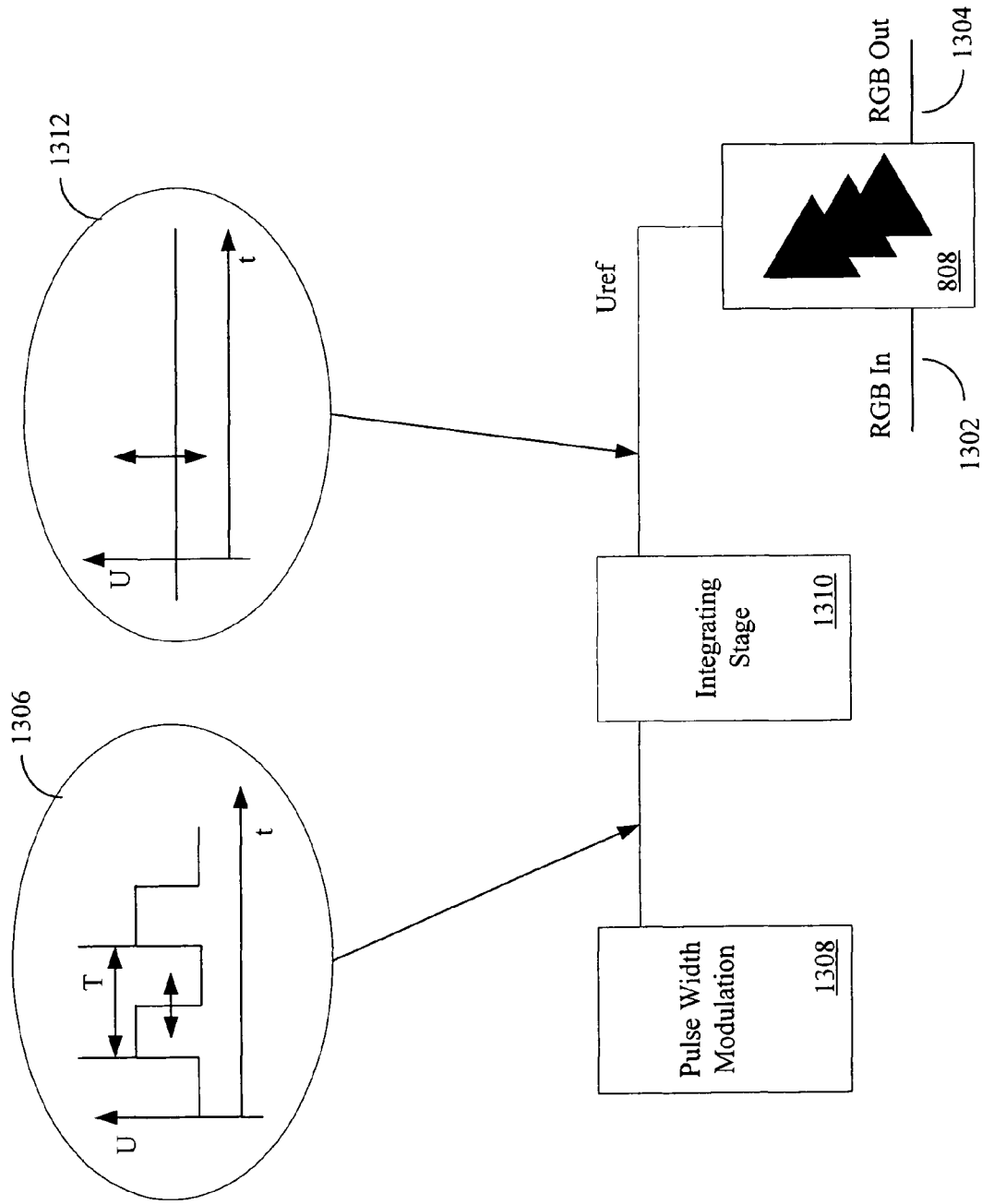
FIG. 13 shows pulse width modulation control of a brightness adjustment.

FIG. 13 provides an additional example of pulse width modulated brightness control. The enhancement logic 808 receives a digital input video signal 1302, which includes RGB image data. The enhancement logic 808 enhances selected pixels of the input video signal by modifying the levels of the RGB data in response to a synchronized brightness control signal and according to the brightness adjustment to generate the output video signal 1304.

The brightness adjustment is represented in FIG. 13 by the Uref signal 1312. The brightness adjustment signal 1312 may vary in accordance with a pulse width modulated control signal 1306 output by the pulse width modulator 1308. An integrating stage 1310 (e.g., an RC filter) converts the pulse width modulated control signal 1306 to the brightness adjustment signal 1312. As the duty cycle of the modulated control signal 1306 varies, the brightness adjustment signal 1312 changes to specify a new level of enhancement for the selected pixel subset.

Figure 14:
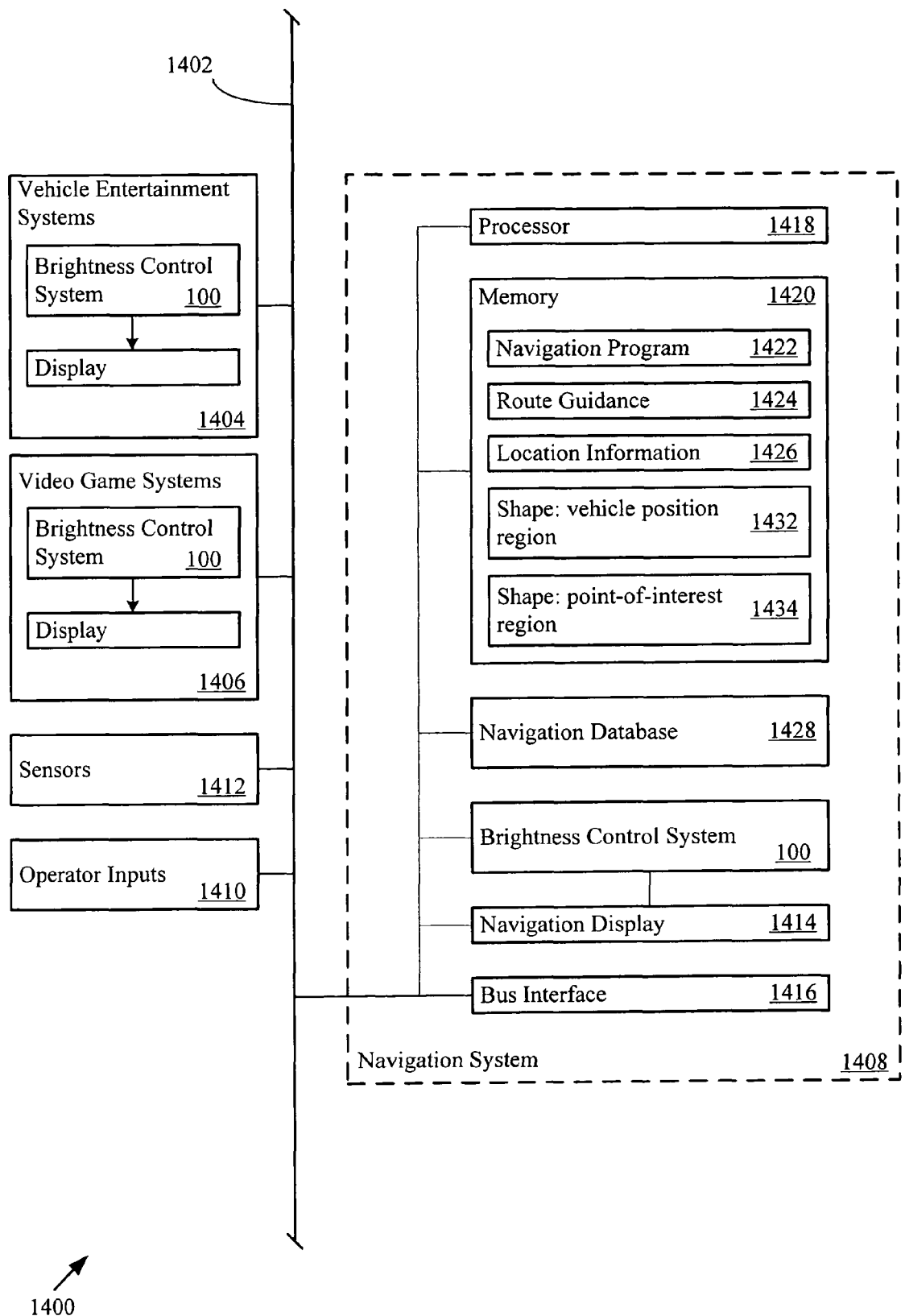
FIG. 14 shows a vehicle bus interfaced to electronic modules which incorporate brightness control systems.

The brightness control system 100 may be incorporated into stand alone devices (e.g., portable game systems or personal data assistants) as well as any vehicle component. FIG. 14 shows a vehicle component system 1400 in which the components interface and communicate on a vehicle bus 1402. The vehicle component system 1400 includes electronic modules which display information for the driver and passengers. Examples of the electronic modules include vehicle entertainment systems 1404 (e.g., a DVD player, CD player, portable music player, or other entertainment system), video game systems 1406, and a navigation system 1408.

The electronic modules 1404-1408 may accept input from the operator inputs 1410, including a voice recognition system, keyboard, function switches, or other inputs. The operator inputs 1410 may communicate operator selections over the vehicle bus 1402 to any of the electronic modules 1404-1408. Alternatively, one or more of the electronic module 1404-1408 may include local operator inputs. Sensors 1412 may measure and communicate levels of ambient light, noise, vehicle performance, or other data to a bus interface (e.g., the bus interface 1416 in the navigation system 1408) of any of the electronic modules 1404-1408.

Each electronic module 1404-1408 may include a brightness control system 100 and a display. Thus, for example, the navigation system 1408 may enhance the clarity, intelligibility, or visibility of any portion of navigation information provided on the navigation display 1414. In the navigation system 1408, the processor 1418 executes, from a memory 1420, a navigation program 1422. The navigation program 1422 may provide route guidance data 1424, location information 1426, or any other navigation data to the driver on the navigation display 1414. A navigation database 1428 may provide a source of map data, route data, points of interest data, or any other navigation data for the navigation program 1422. In addition, the memory 1420 may store shape data. The shape data may define the shapes for image enhancement regions. For example, the vehicle position region shape data 1432 may define the shape and/or size of the enhancement region 220, while the point-of-interest region shape data 1434 may define the shape and/or size of the enhancement region 402.

In response to the data provided by the sensors 1412, any of the electronic modules 1404-1408 may initiate brightness control over displayed images. As one example, a light level sensor may detect and report ambient light levels. The navigation system 1408, for instance, may respond to low ambient light levels (e.g., below a low-light threshold) to enhance the brightness of navigation information on the navigation display 1414. Such light levels may be present at night, when the vehicle is underground, or when the vehicle travels through a tunnel. Similarly, when the ambient light levels are significant (e.g., above a high-light threshold), the navigation system 1408 may also enhance brightness to make selected navigation information more visible on the navigation display 1414.

Figure 15:
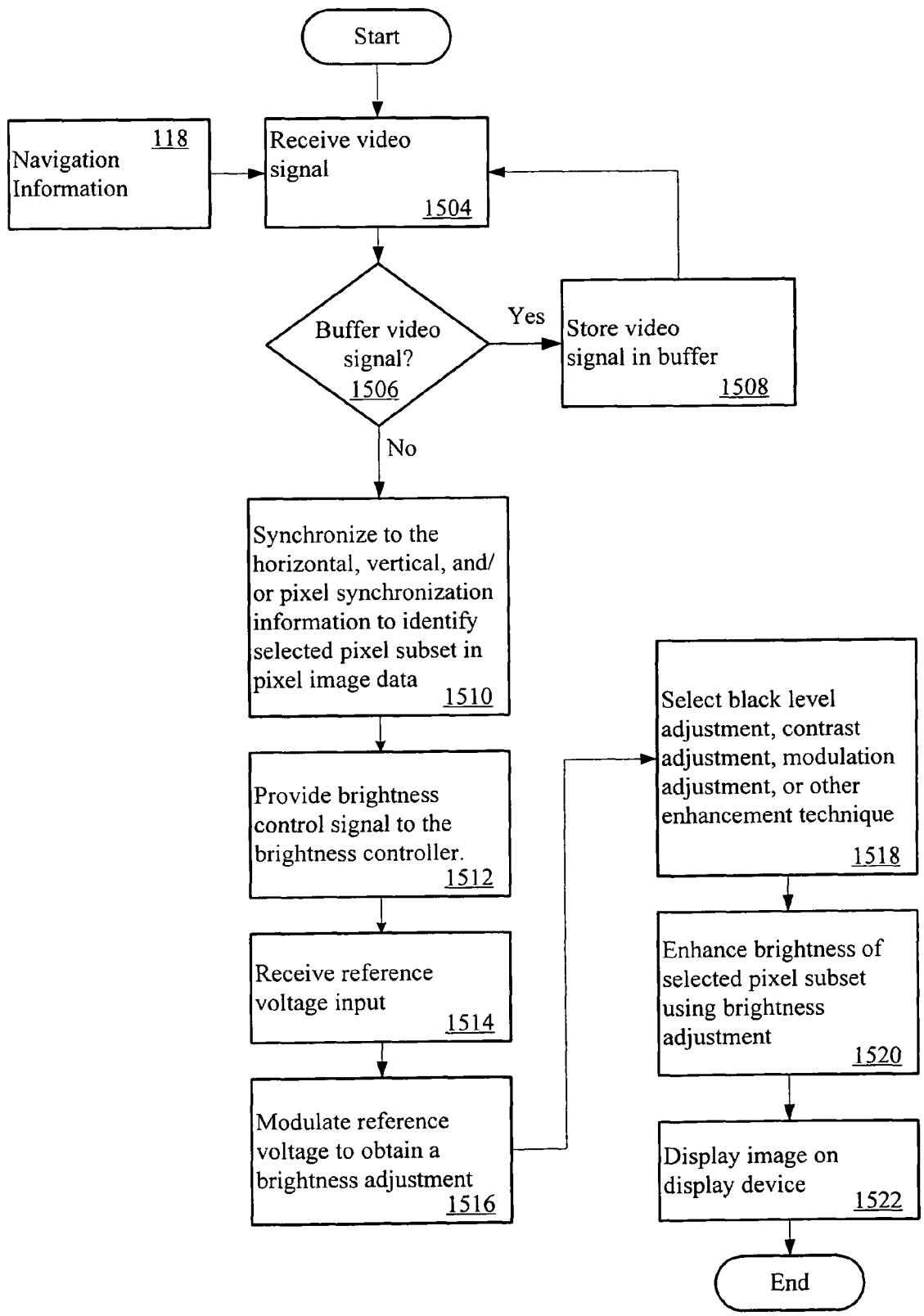
FIG. 15 shows a flow diagram of the acts which the brightness control system may take to selectively enhance the brightness of a portion of an image.

FIG. 15 illustrates acts which the brightness control system 100 may take to enhance brightness of an image or selected pixels in the image, particularly in the context of a vehicle navigation system. The navigation system 120 supplies the navigation information to the brightness control system 100. In addition, the brightness controller 104 receives an input video signal 116 (Act 1504). The input video signal 116 may be an analog or digital video signal which defines a sequence of images.

The brightness control system 100 may determine whether to buffer the input video signal 116 (Act 1506). The video buffer may store image data for later processing (including brightness enhancement), frame synchronization, error checking, or other processing. When the brightness control system 100 determines to buffer the input video signal 116, the brightness control system 100 stores the image data in a memory (Act 1508).

The control signal generator 108 synchronizes to horizontal, vertical, and/or pixel synchronization information in or accompanying the input video signal 116 (Act 1510). The control signal generator outputs a brightness control signal which specifies a selected pixel subset in the image pixel data for brightness enhancement (Act 1512). The brightness control signal may directly specify a brightness adjustment, may specify the duty ratio of am modulated control signal which determines a brightness adjustment, or the brightness control system 100 may determine the brightness adjustment in other manners (e.g., by retrieving a configurable operator preference setting from a memory).

In one implementation, the brightness control system 100 modulates a reference voltage to determine the brightness adjustment. To that end, the brightness control system 100 receives the reference voltage input 112 (Act 1514). The modulator 806 may apply a pulse width modulated control signal to switch the reference voltage 'on' and 'off' through an RC filter. A DC brightness adjustment results, at a level which is set according to the duty ratio of the modulated control signal.

The brightness control system 100 may enhance image brightness in many different ways. Accordingly, the brightness control system 100 determines which enhancement technique to apply (Act 1518) using preset preferences or settings, by accepting operator input, or in other manners. As examples, the brightness control system 100 may select between black level adjustment, contrast adjustment, direct manipulation of an active portion of the input video signal 116, direct manipulation of RGB or other pixel data, or other techniques. The brightness control system 100 may also determine whether to amplify brightness of a selected pixel subset, attenuate brightness of surrounding pixels, or perform the enhancement in another manner. The brightness controller 104 applies the brightness adjustment to the selected pixel subset (Act 1520). The brightness control system may then provide the output video signal 114 to the display (Act 1522).

Figure 16:
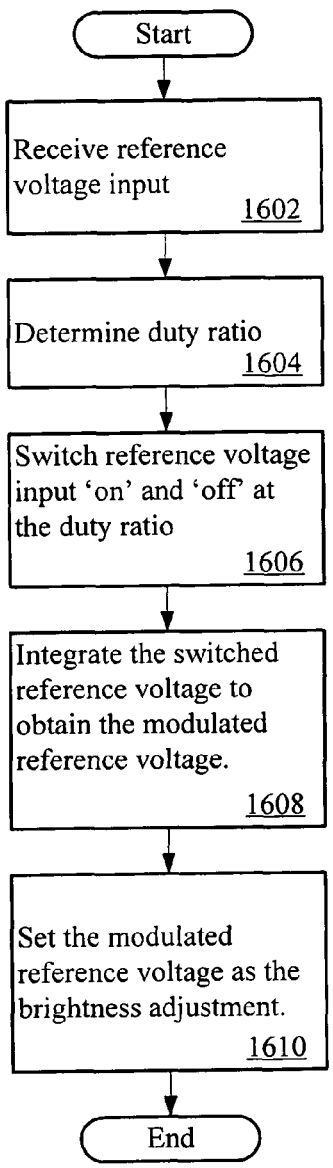
FIG. 16 shows a flow diagram of the acts which a modulator may take to determine a modulated reference voltage.

FIG. 16 illustrates the acts which the modulator 806 may take to establish a modulated reference voltage for use as a brightness adjustment. The modulator 806 obtains an input reference voltage 112 (Act 1602). The reference voltage may establish a voltage level which the modulator will pulse width modulate to obtain the modulated reference voltage.

To that end, the modulator 806 determines a duty ratio, d, for the pulse width modulation (Act 1604). The reference voltage is switched 'on' and 'off' at the duty ratio. (Act 1606). The modulator 806 integrates the switched reference voltage (e.g., using an RC filter) to obtain the modulated reference voltage (Act 1608). The modulated reference voltage may take any value between 0 and the value of the reference voltage, and may be set as the brightness adjustment applied to image data through black level adjustment, contrast adjustment, direct manipulation of the active portion of the input video signal 116, or through other techniques (Act 1610).

Figure 17:
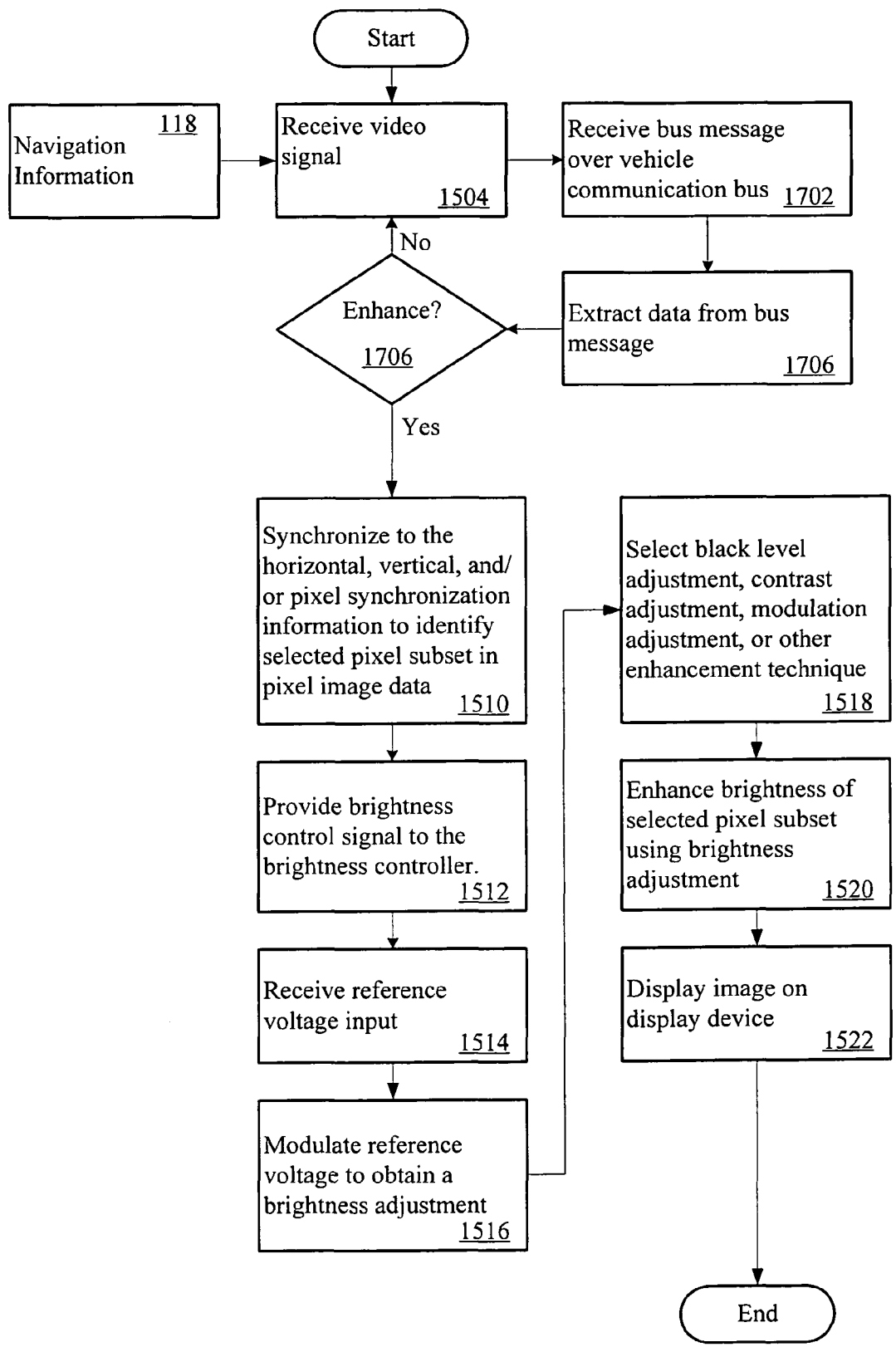
FIG. 17 shows a flow diagram of the acts which the brightness control system may take to selectively enhance the brightness of a portion of an image in response to vehicle bus messages.

FIG. 17 illustrates the acts which the brightness control system 100 may take to enhance brightness in response to bus messages on the vehicle bus 1402. A bus interface 1416 receives bus messages transmitted on the vehicle bus 1402 (Act 1702). Any of the electronic modules 1404-1408 may prepare and send the bus messages. In addition, the bus messages may be sent by any of the sensors 1412 or operator inputs 1410.

For example, the operator inputs 1410 may send bus messages which convey operator commands to move, resize, reshape, or change the brightness adjustment to brightness enhanced regions on the display, such as those shown in FIGS. 2-6. As another example, the sensors 1412 may transmit bus messages conveying the ambient light level, vehicle status and warnings, noise levels, speed, proximity to other objects, or any other information. The brightness control system 100 extracts the data from the bus message (Act 1706). Based on the data, the brightness control system 100 may determine whether to enhance the brightness of a selected pixel subset of an image (Act 1706).

For example, when the brightness control system 100 receives a bus message that ambient light is relatively low, the brightness control system 100 may enhance the brightness of selected navigational information in the image. The navigational information is thereby made more noticeable and intelligible for the driver. As another example, when the brightness control system 100 receives warning information about speed, proximity to other objects, engine (or other vehicle system) operation, the brightness control system 100 may respond by enhancing the brightness of a portion (e.g., a warning message) of an image.

Figure 18:
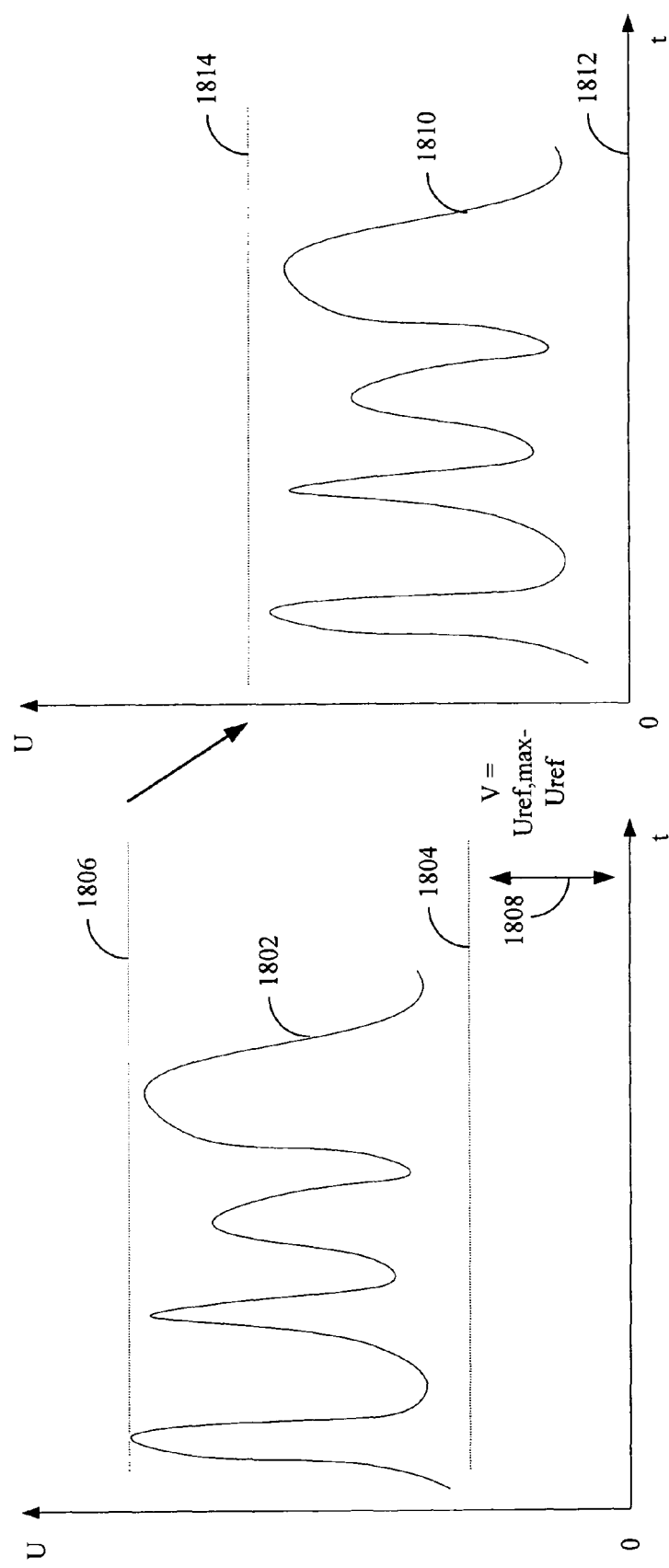
FIG. 18 shows a black-level adjustment to enhance brightness of a portion of an image.

The enhancement logic 808 may enhance image brightness in other manners than that described above. As additional examples, the enhancement logic 808 may enhance image brightness through black level adjustment or contrast adjustment using level shifters, analog or digital adders or multipliers, or other circuitry. FIG. 18 illustrates a black level adjustment for a selected pixel subset of an image. The enhancement logic 808 may apply a modulated reference voltage as an additive component to the selected pixel subset or as a subtractive component to pixels around the selected pixel subset to enhanced the brightness of the selected pixel subset in the output video signal 114.

In FIG. 18, a segment of an active portion 1802 of an input video signal conveys pixel image data for a portion of a line in the image. The active portion 1802 varies in voltage between the black level 1804 and the maximum brightness voltage 1806. The brightness controller 104 level shifts the active portion 1802 to enhance brightness of a portion of the image.

In particular, the brightness controller 104 level shifts the active portion 1802 of the input video signal by the reference voltage 1808. The reference voltage 1808 may be provided by the reference voltage input 112, by modulating a reference voltage (e.g., using an RC filter), by the control signal generator 108, or by other sources of a brightness adjustment. After level shifting, the segment of the active portion 1802 is lowered in voltage.

FIG. 18 shows the corresponding segment of the active portion 1810 of the output signal. The black level 1812 has been reduced by the reference voltage 1808. In addition, there is a corresponding decrease in the maximum brightness voltage 1814 in the output video signal. A decrease in brightness for the segment of the active portion 1810 results, thereby enhancing the brightness of surrounding pixels in the image.

Figure 19:
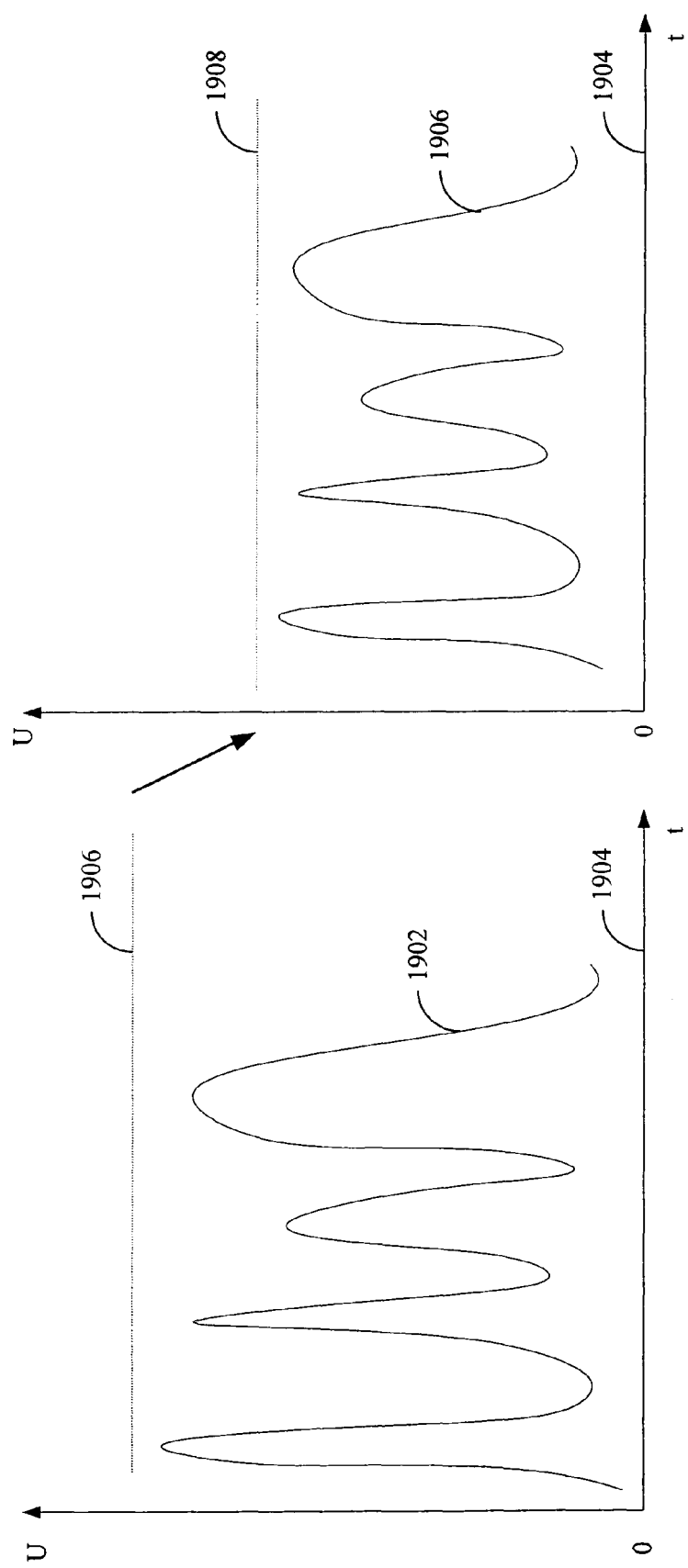
FIG. 19 shows a contrast adjustment to enhance brightness of a portion of an image.

The brightness controller 104 may also enhance brightness through a contrast adjustment. The contrast adjustment may be implemented as the application of a gain to a selected pixel subset of an image. FIG. 19 provides an example of a gain adjustment for a portion of an image. The brightness controller 104 applies an attenuation factor 'g' to a segment of an active portion 1902 of an input video signal which defines one or more pixels of the image. The attenuation factor may be defined as the ratio of a voltage value U' after attenuation (or amplification) to the corresponding voltage value U before attenuation (or amplification):

$$g = \frac{U'}{U} \quad (4)$$

The attenuation factor 'g' may be constant or may vary over the segment of the active portion 1902. Holding the attenuation factor constant may mitigate signal distortion.

In FIG. 19 the segment of the active portion 1902 of the input video signal varies between the black level 1904 and the maximum brightness voltage 1906. The segment of the active portion 1906 of the output video signal results from the application of the attenuation factor by the brightness controller 104. After attenuation, the segment of the active portion 1906 has a decreased modulation depth. In other words, the difference between the upper limit of the maximum brightness voltage 1908 and the black level 1904 has been decreased compared with the corresponding values of the maximum brightness voltage 1906 and the black level 1904 prior to attenuation.

Both the black level adjustment illustrated in FIG. 18 and the gain adjustment illustrated in FIG. 19 may be performed on a selected subset of image pixel data. The brightness control signal may be synchronized vertically, horizontally, and by individual pixel to select a pixel subset for enhancement on a line-by-line basis. In response to the brightness control signal, the brightness controller 104 adjusts the contrast and/or black level of the input video signal 116 to generate an output video signal 114 with brightness adjustments made to the selected subset of pixel image data. The brightness control system 100 thereby avoids individual pixel-by-pixel recalculation of image data.

Although selected aspects, features, or components of the implementations are depicted as being stored in hardware memories, all or part of systems and methods consistent with the brightness control system 100 may be stored on, distributed across, or read from other machine-readable media, for example, secondary storage devices such as hard disks, floppy disks, and CD-ROMs; other forms of ROM or RAM; transmitted signals; or other machine readable media. Furthermore, the brightness control system 100 may include additional or different components than described above. For example, a processor may be implemented as a microprocessor, microcontroller, application specific integrated circuit (ASIC), discrete logic, or a combination of other types of circuits or logic. Level shifting, multiplication, modulation, and other logic may be implemented in hardware, software, or a combination of hardware and software.

While various embodiments of the invention have been described, it will be apparent to those of ordinary skill in the art that many more embodiments and implementations are possible within the scope of the invention. For example, the brightness control system may additionally or alternatively modify red, green, and/or blue color information to enhance an image by color, rather than overall brightness. Accordingly, the invention is not to be restricted except in light of the attached claims and their equivalents.

We claim:
1. A method for image brightness control, comprising:
receiving a video signal comprising pixel image data for display, where the video signal defines the brightness and color for each pixel in the image to display the image on a display;
receiving a first brightness control signal synchronized with at least first horizontal, first vertical, and first pixel timing and/or first synchronization information in the video signal to specify a first selected pixel subset in the pixel image data;
receiving a second brightness control signal synchronized with at least second horizontal, second vertical, and second pixel timing and/or second synchronization information in the video signal to specify a second selected pixel subset in the pixel image data;
receiving a reference voltage, the reference voltage defining an overall range of brightness for display of the video signal;
modulating the reference voltage to determine a first brightness adjustment responsive to the first brightness control signal, wherein the modulation to the reference voltage to determine the first brightness adjustment adjusts the reference voltage which leads to an overall shift of the video signal without modification of the video signal;
modulating the reference voltage to determine a second brightness adjustment responsive to the second brightness control signal; and simultaneously enhancing brightness of the first selected pixel subset and the second selected pixel subset using the first brightness adjustment and the second brightness adjustment, respectively.

2. The method of claim 1, where determining comprises:
determining the first brightness adjustment based on a duty ratio of a pulse width modulated signal.

3. The method of claim 1, where receiving a video signal comprises:
receiving a video signal from a navigation system, the pixel image data comprising map image data.

4. The method of claim 3, where:
the map image data comprises a vehicle position received from the navigation system, and where:
the first selected pixel subset comprises the vehicle position.

5. The method of claim 4, where the first selected pixel subset comprises a region around the vehicle position.

6. The method of claim 3, where:
the map image data comprises a point-of-interest position received from the navigation system, and where the first selected pixel subset comprises a region around the point-of-interest.

7. The method of claim 1, where enhancing comprises:
adjusting a black level of a portion of the video signal conveying the first selected pixel subset.

8. The method of claim 1, where enhancing comprises:
adding the first brightness adjustment to the first selected pixel subset.

9. The method of claim 1, where enhancing comprises:
reducing brightness of the pixel image data, except for the first selected pixel subset.

10. The method of claim 1, further comprising:
receiving an ambient light measurement; and where enhancing brightness of the first selected pixel subset comprises:
enhancing brightness of the first selected pixel subset using the first brightness adjustment and based on the ambient light measurement.

11. The method of claim 1, where determining comprises:
periodically switching a reference voltage in accordance with a duty ratio d;
obtaining a voltage value by integrating the periodically switched reference voltage; and
setting the voltage value as the first brightness adjustment.

12. An image brightness control system comprising:
a video signal input for receiving a video signal comprising pixel image data for display, where the video signal defines the brightness and color for each pixel in the image to display the image on a display;
a first brightness control signal input for receiving a first brightness control signal synchronized with at least first horizontal, first vertical, and first pixel timing and/or first synchronization information in the video signal to specify a first selected pixel subset in the pixel image data;
a second brightness control signal input for receiving a second brightness control signal synchronized with at least second horizontal, second vertical, and second pixel timing and/or second synchronization information in the video signal to specify a second selected pixel subset in the pixel image data;
a reference voltage input for receiving a reference voltage that defines an overall range of brightness for display of the video signal;
a modulator coupled to the reference voltage input and operable to modulate the reference voltage to determine a first brightness adjustment responsive to the first brightness control signal, wherein the modulation to the reference voltage to determine the first brightness adjustment adjusts the reference voltage which leads to an overall shift of the video signal without modification of the video signal and wherein the modulator is further operable to modulate the reference voltage to determine a second brightness adjustment responsive to the second brightness control signal; and
modification logic which simultaneously enhances brightness of the first selected pixel subset and the second selected pixel subset using the first brightness adjustment and second brightness adjustment, respectively.

13. The image brightness control system of claim 12, further comprising:
a filter which determines the first brightness adjustment from the reference voltage.

14. The image brightness control system of claim 13, where the filter comprises an RC filter which integrates the reference voltage.

15. The image brightness control system of claim 14, where the reference voltage comprises a level setting signal periodically switched in accordance with a duty ratio d, and where the filter integrates the reference voltage to obtain the first brightness adjustment.

16. The image brightness control system of claim 15, where the modification logic comprises an attenuator which subtracts the first brightness adjustment from the pixel image data, except for the first selected pixel subset.

17. A vehicle navigation system comprising:
a memory comprising:
map data; and
a vehicle navigation program which generates a navigation map using the map data;
a display which displays a brightness enhanced video signal comprising pixel image data of the navigation map; and
an image brightness control system coupled to the display, comprising:
a first brightness control signal input for receiving a first brightness control signal synchronized with at least first horizontal, first vertical, and first pixel timing and first synchronization information in the video signal to specify a first selected pixel subset in the pixel image data;
a second brightness control signal for receiving a second brightness control signal synchronized with at least second horizontal, second vertical, and second pixel timing and second synchronization information in the video signal to specify a second selected pixel subset in the pixel image data;
a reference voltage input for receiving a reference voltage that defines an overall range of brightness for display of the video signal;
a modulator coupled to the reference voltage input and operable to modulate the reference voltage to determine a first brightness adjustment responsive to the first brightness control signal, wherein the modulation to the reference voltage to determine the first brightness adjustment adjusts the reference voltage which leads to an overall shift of the video signal without modification of the video signal and wherein the modulator is further operable to modulate the reference voltage to determine a second brightness adjustment responsive to the second brightness control signal; and
modification logic which simultaneously enhances brightness of the first selected pixel subset and the second selected pixel subset using the first brightness adjustment and the second brightness adjustment, respectively.

18. The vehicle navigation system of claim 17, where the memory further comprises shape data defining the first selected pixel subset.

19. The vehicle navigation system of claim 18, where the shape data defines one of a vehicle position region and a point-of-interest region.

20. The vehicle navigation system of claim 17, further comprising a vehicle communication bus interface coupled to the image brightness control system.

21. The vehicle navigation system of claim 20, where the image brightness control system is operable to receive an ambient light measurement from the vehicle communication bus interface, and where the modification logic enhances the brightness based on the ambient light measurement.

22. The vehicle navigation system of claim 21, where the modification logic comprises an attenuator which subtracts the first brightness adjustment from the pixel image data except for the first selected pixel subset.

23. The vehicle navigation system of claim 17, where the modification logic comprises an attenuator which subtracts the first brightness adjustment from the pixel image data, except for the first selected pixel subset.

* * * * *